UNITED STATES PATENT OFFICE.

SAMUEL PEACOCK, OF CHICAGO, ILLINOIS, ASSIGNOR TO INTERNATIONAL AGRICULTURAL CORPORATION, OF NEW YORK, N. Y., A CORPORATION OF NEW YORK.

PROCESS FOR FIXING ATMOSPHERIC NITROGEN.

1,123,584.     Specification of Letters Patent.     Patented Jan. 5, 1915.

No Drawing.     Application filed April 19, 1913. Serial No. 762,299.

*To all whom it may concern:*

Be it known that I, SAMUEL PEACOCK, a citizen of the United States, residing at Chicago, in the county of Cook and State of Illinois, have invented certain new and useful Improvements in Processes for Fixing Atmospheric Nitrogen; and I do hereby declare the following to be a full, clear, and exact description of the invention, such as will enable others skilled in the art to which it appertains to make and use the same.

This invention relates to a process for fixing atmospheric nitrogen and has for its object to lessen the cost and to improve the efficiency of the processes heretofore proposed.

With these and other objects in view, the invention consists in the novel steps and combinations of steps constituting my process all as are more fully hereinafter disclosed and particularly pointed out in the claims.

In order that the underlying principles of this invention may be more clearly understood it is said:—It is well known that a large number of chemical elements form compounds with carbon in which the valency of the carbon varies according to the temperature and the pressure as well as with the nature of the combining element or elements. This scientific fact may be well illustrated with calcium, which at temperatures of say 2500° C. and at pressures governed by the quantity of molten lime in the furnace, forms calcium carbid $CaC_2$, and which in turn will react with water to form acetylene gas. But this same carbid will lose half its carbon, if heated to only 1200° C. in a powdered condition and at atmospheric pressure, thus causing the carbon left to change its valency. Again, at the temperature necessary to produce an acetylene forming carbid with aluminum instead of with calcium as above, the said carbid $(Al_2C_6)$ is not stable and dissociates under certain conditions as fast as formed. This dissociation, however, can be checked by permitting the formation of the carbid $Al_4C_3$ as an end product, thus again influencing the permanency of the valency of the carbon in the previously mentioned carbid $Al_2C_6$. In a similar manner sulfur carbid $SC_4$, under normal conditions of formation, breaks down until an end product, which is stable at ordinary temperatures and pressures, such as $S_2C$ is formed. And while a number of higher intermediate carbids may have been formed and served as a source for the said final stable form or end product $S_2C$, there is not known at present any commercial method of isolating these said higher carbids as such. Again, and while these said higher carbids may not actually be present in compounds as produced, yet reaction products of these said higher carbids may be, and sometimes are stable under ordinary conditions of temperature and pressure. For example, the aluminum carbid $Al_2C_3$ is not stable at the temperature necessary for its formation from alumina and carbon; but in an atmosphere of nitrogen this carbid forms a reaction product in accordance with the following equations:—

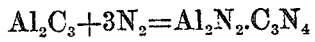
$$Al_2C_3 + 3N_2 = Al_2N_2.C_3N_4$$

In like manner as is well known, calcium at compartively moderate temperatures forms a similar compound as follows:—

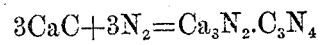
$$3CaC + 3N_2 = Ca_3N_2.C_3N_4$$

I have discovered that sulfur forms two similar compounds also at moderate temperatures which may be expressed by the following equations;—

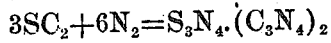
$$3SC_2 + 6N_2 = S_3N_4.(C_3N_4)_2$$

and

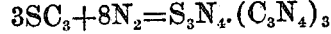
$$3SC_3 + 8N_2 = S_3N_4.(C_3N_4)_3$$

I have further discovered that these nitrogen compounds of sulfur and carbon, are gaseous at atmospheric pressure and the temperatures of their formation. I have also discovered that they react with hot water to produce ammonia as below explained and thereby serve as a very economical means of fixing atmospheric nitrogen. One method of producing these sulfur carbon compounds of nitrogen is as follows:—Sulfur either in the refined or crude form, or as pyrites is burned with a minimum supply of air, under well known conditions, so that all of the free oxygen is combined as $SO_2$ or $SO_3$. The resulting gas or atmosphere, then becomes a mixture containing approximately somewhat more than 80% nitrogen, and somewhat less than 20% sulfur oxids. This mixture I next pass over carbon maintained by any suitable means at a temperature of about 800° C. when the following reactions take place:

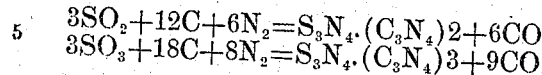
$$3SO_2 + 12C + 6N_2 = S_3N_4.(C_3N_4)2 + 6CO$$
$$3SO_3 + 18C + 8N_2 = S_3N_4.(C_3N_4)3 + 9CO$$

By passing these nitrogen compounds thus obtained through water or steam maintained at high temperatures under pressure if necessary, the following reactions occur:—

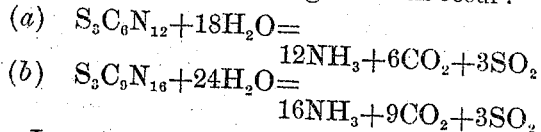
(a) $S_3C_6N_{12} + 18H_2O = 12NH_3 + 6CO_2 + 3SO_2$
(b) $S_3C_9N_{16} + 24H_2O = 16NH_3 + 9CO_2 + 3SO_2$ I prefer to use a solution of sulfuric or other acid in the water by means of which the ammonia may be fixed as a salt, while the free sulfur dioxid, $SO_2$, present, and the unused nitrogen and oxids of carbon may pass through and be recovered if desired. But I may also use lime water in some cases, which will permit the ammonia, the carbon monoxid and the uncombined nitrogen to pass off as gases and to be recovered as such.

It is obvious that those skilled in the art may vary the above processes without departing from the spirit of my invention and therefore I do not wish to be limited to the above disclosure except as may be required by the claims.

What I claim is:—

1. The process of producing a compound of sulfur, carbon and nitrogen, which consists in bringing an oxid of sulfur, and free nitrogen, into contact with carbon at a temperature sufficient to produce said compound, substantially as described.

2. The process of producing a compound of sulfur, carbon and nitrogen which consists in bringing a mixture containing nitrogen and an oxid of sulfur, into contact with carbon, at a temperature of substantially 800° C., substantially as described.

3. The process of fixing atmospheric nitrogen which consists in segregating a definite quantity of sulfur, igniting said sulfur and feeding air thereto in such a quantity as will cause substantially all of its contained oxygen to be combined as an oxid of sulfur; collecting the nitrogen containing mixture thus produced; and bringing said mixture into contact with free carbon at a temperature sufficient to bring about said nitrogen fixation, substantially as described.

4. The process of producing ammonia which consists in bringing an oxid of sulfur and atmospheric nitrogen into contact with carbon at a temperature sufficient to cause said sulfur, carbon and nitrogen to combine; and treating the compound thus produced with water to cause said nitrogen to combine with the hydrogen of the water to form ammonia, substantially as described.

5. The process of producing ammonia which consists in burning sulfur with air in such limited quantities as to rob said air of substantially all its oxygen; passing the gaseous mixture containing oxids of sulfur, and nitrogen thus produced into contact with carbon at substantially 800° C. to form a compound of sulfur carbon and nitrogen; and treating said compound with hot water to cause the said nitrogen and hydrogen of the water to form ammonia, substantially as described.

In testimony whereof I affix my signature, in presence of two witnesses.

SAMUEL PEACOCK.

Witnesses:
C. COLLINS,
W. STEWER.